United States Patent [19]

Buono et al.

[11] E Re. 30,210

[45] Reissued Feb. 12, 1980

[54] DAMPED INTERSHAFT BEARING AND STABILIZER

[75] Inventors: Dennis F. Buono, East Hartford; Nils G. Carlson, Glastonbury; David H. Hibner, Colchester; Donald C. Moringiello, Windsor, all of Conn.

[73] Assignee: United Technologies Corporation, Hartford, Conn.

[21] Appl. No.: 963,072

[22] Filed: Nov. 22, 1978

Related U.S. Patent Documents

Reissue of:

[64] Patent No.: 4,046,430
Issued: Sep. 6, 1977
Appl. No.: 666,530
Filed: Mar. 12, 1976

[51] Int. Cl.[2] ..... F16C 35/08

[52] U.S. Cl. ..... 308/26; 308/184 R

[58] Field of Search ..... 308/9, 15, 26, 27, 28, 308/36, 184

[56] References Cited

U.S. PATENT DOCUMENTS

| | | | |
|---|---|---|---|
| 3,011,840 | 12/1961 | Littleford | 308/184 |
| 3,053,590 | 9/1962 | Dison | 308/184 |
| 3,421,686 | 1/1969 | Coplin et al. | 308/15 X |
| 3,424,508 | 1/1969 | Kizer et al. | 308/184 |
| 3,979,155 | 9/1976 | Sood et al. | 308/15 |

*Primary Examiner*—Robert B. Reeves
*Assistant Examiner*—Gene A. Church
*Attorney, Agent, or Firm*—Norman Friedland

[57] ABSTRACT

A viscous damper for a bearing mounted between coaxially mounted shafts rotating at relative speeds is stabilized by mounting a spring in parallel with the damper so as to raise the natural frequency of one of the shafts.

11 Claims, 3 Drawing Figures

DAMPED INTERSHAFT BEARING AND STABILIZER

Matter enclosed in heavy brackets [ ] appears in the original patent but forms no part of this reissue specification; matter printed in italics indicates the additions made by reissue.

BACKGROUND OF THE INVENTION

This invention relates to intershaft bearings of the type utilized for supporting coaxially mounted shafts interconnecting the compressors and turbines of a multi-spool gas turbine engine and particularly to means for stabilizing the viscous damper.

As is well known in the art an inherent vibratory instability can exist in a multi-shaft rotor system which is connected by a viscous (oil) damper. This instability is similar to the well known "oil whip" which is experienced on high speed rotating machinery which incorporates plain journal bearings. The instability results from the development of a rotating pressure field when one shaft spins. This pressure can excite the natural frequency of the other shaft and force the system into high, uncontrollable vibration.

We have found that we can obviate the problem noted above and eliminate this instability from the operating speed range of the first shaft by raising the natural frequency of the second shaft with a spring mounted in parallel with the viscous damper. This spring can either be a metal structure or an elastomeric one. Thus, in accordance with this invention incorporated between two rotating shafts the damper can be made to perform properly without producing unstable, high amplitude response.

SUMMARY OF THE INVENTION

An object of this invention is to provide an improved viscous damper for an intershaft bearing by incorporating a parallelly mounted spring which stabilizes said viscous damper.

A further object of this invention is to provide parallel mounted springs to a viscous damper for an intershaft bearing utilized to support the coaxially mounted shafts of a gas turbine engine which is characterized by being simple to implement and relatively inexpensive particularly when compared to the alternative of a heavier and larger shaft and/or additional support bearings and/or viscous dampers at other bearing locations. The springs contemplated may be either metal or elastomeric.

Other features and advantages will be apparent from the specification and claims and from the accompanying drawings which illustrate an embodiment of the invention.

DESCRIPTION OF THE PREFERRED EMBODIMENT

Figure 1:
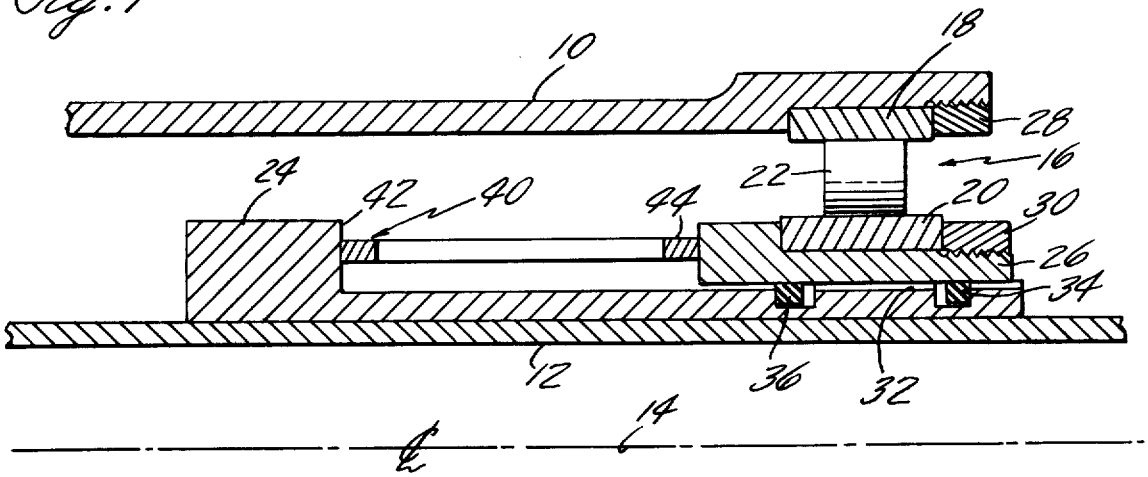
FIG. 1 is a partial view in sectional showing a preferred embodiment of this invention.

For the purposes of this invention only that portion of the bearing and shafts of a turbine power plant is shown that is necessary for an understanding of this invention. As shown in FIG. 1 the coaxially mounted hollow shafts 10 and 12, (mounted about center line 14) are shown at least partially supported by bearing 16. Bearing 16 includes an outer ring 18 defining an outer race and an inner ring 20 defining an inner race supporting therebetween a plurality of circumferentially mounted roller elements 22 (only one being shown). Sleeve element 24 firmly affixed to shaft 12 and rotatable therewith supports bearing retainer 26 and also rotates therewith. Suitable locking nuts 28 and 30 are suitably secured to the threaded end of shaft 10 and threaded end of retainer 26.

An annular groove 32 is formed at one end of sleeve element 24 and lies in the same plane of rollers 22 for defining a fluid or viscous damper. Piston rings 34 and 36 or other suitable sealing elements fitted into recesses adjacent the annular groove 32 serve to prevent the fluid which completely fills this space from leaking. An inlet and outlet, not shown, assures that the damper has a flow of oil under pressure. Dampers as described are well known and do not form the essence of this invention. The purpose of this invention is to be able to utilize such dampers and allow them to function properly in a high speed intershaft application.

In accordance with this invention a spring 40 flexible in a radial direction and stiff axially is mounted parallel to damper 32 by having one end firmly affixed to shoulder 42 and the other end 44 firmly affixed to the end of bearing retainer 26. Spring 40 may be a metal hollow cylinder having axial slots 46 cut along the circumference to permit flexibility and resiliency. The geometry is selected to provide a specific stiffness between shafts 10 and 12 which will raise the natural frequency of shaft [12] *10* above the operating speed of shaft [10] *12*. In doing so, the tendency of having the natural frequency of this shaft become excited is eliminated permitting the damper to function properly without producing unstable, high amplitude response.

Figure 2:
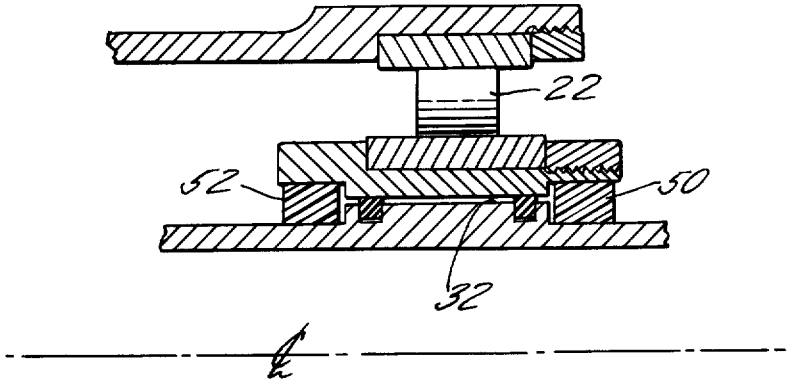
FIG. 2 is another partial view in section showing another embodiment.
Figure 3:
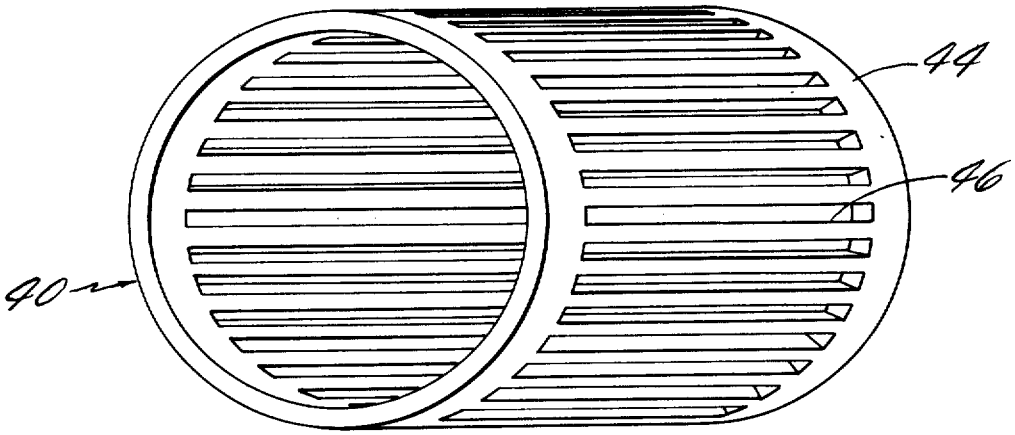
FIG. 3 is a perspective view showing the spring utilized in the FIG. 1 embodiment.

FIG. 2 is substantially identical to the embodiment of FIG. 1 and like elements designate like parts. Similarly, viscous damper 32 is mounted in the plane of roller element 22. The bearing retainer 26 is recessed at either end to accommodate the ring elements 50 and 52, which are rectangular in cross section. The material selected for ring elements 50 and 52 is a well known commercially available elastomeric substance exhibiting good spring characteristics and capable of withstanding the temperature environment. Like spring 40, elements 50 and 52 are parallel with respect to damper 32 and serve as a spring in the same manner as does spring 40. It is apparent from the foregoing that in both embodiments described springs 50 and 52 and spring 40 serve to change the critical speed of shaft 10 and in so doing permits the damper, which heretofore did not function at high speeds, to operate successfully.

It is contemplated within the scope of this invention that the outer shaft can be the supporting shaft rather than the inner shaft as shown. In this instance, the viscous damper annulus would surround the bearing outer race and the spring would be mounted in parallel therewith. Also, as one skilled in this art will appreciate the invention is not limited to any particular bearing or bearing configuration, as ball, tapered, fluid bearings and the like could equally be employed.

It should be understood that the invention is not limited to the particular embodiments shown and described herein, but that various changes and modifications may be made without departing from the spirit or scope of this novel concept as defined by the following claims.

We claim:

1. Damping means for an inner shaft and outer shaft mounted in coaxial relation, bearing means mounted between said inner shaft and said outer shaft, a fluid damper mounted under the bearing and includes an annular groove surrounding at least one of said shafts which is filled with a viscous fluid, radial restraint means mounted on said one of said shafts in parallel with the viscous damper means to impart a load to the other of said shafts to change its critical speed to a value above the maximum rotational speed of said one of said shafts and stabilize the viscous damper.

2. Damping means as claimed in claim 1 wherein said radial restraint means includes ring-like elements spaced on opposite ends of said annular groove and are sandwiched between said bearing means and said one of said shafts.

3. Damping means as claimed in claim 2 wherein said ring-like elements are made from an elastomeric material.

4. Damping means as claimed in claim 2 wherein said ring-like elements are made from a metallic material.

5. Damping means as claimed in claim 1 wherein said radial restraint means includes a cylinder-like element surrounding said one of said shafts having one end attached to said one of said shafts and the other end attached to said bearing means forming a cantilever spring.

6. In combination, inner and outer coaxially mounted shafts for a twin spool gas turbine power plant, a roller bearing between said shafts including an inner race adjacent said inner shaft, a race supporting ring secured to said inner shaft to rotate therewith supporting said inner race, a viscous damper including pressurized viscous fluid in an annular space between said shaft and said race supporting ring, axial extension portions on said race supporting ring radially spaced from said inner shaft, spring means mounted in said space to add stiffness in parallel with said viscous damper through said bearing means to said outer shaft to increase its critical speed relative to said inner shaft maximum speed whereby said viscous damper is rendered stable.

7. In combination as in claim 6 wherein said spring means includes an elastomeric ring-like element flexible radially.

8. In combination as in claim 6 wherein said spring means includes a metallic spring-like element flexible radially.

9. In combination, inner and outer coaxially mounted shafts for a twin spool gas turbine power plant, a roller bearing between said shafts including an inner race adjacent said inner shaft, a race supporting ring secured to said inner shaft to rotate therewith supporting said inner race, a viscous damper including pressurized viscous fluid in an annular space between said shaft and said race supporting ring, a sleeve secured to said inner shaft to rotate therewith between said race supporting ring and inner shaft, spring means interconnecting said sleeve and said race supporting ring to add stiffness in parallel with said viscous damper through said bearing means to said outer shaft to increase its critical speed relative to said inner shaft whereby said viscous bearing is rendered stable.

10. In combination as in claim 9 where said sleeve includes a flange axially spaced from said race supporting ring and one end of said spring means is secured to said flange and its opposing end is secured to said race supporting ring.

11. In combination as in claim 10 wherein said spring means includes a cylindrical member having hub-like opposing ends with one end secured to said flange and the other end secured to said race supporting ring, and rod-like elements extending between said hub-like opposing ends deflectable in a radial direction.

* * * * *